United States Patent [19]

McMullen et al.

[11] 4,017,363

[45] Apr. 12, 1977

[54] PRODUCTION OF HIGH PURITY GLUCOSE SYRUPS

[75] Inventors: William H. McMullen, Norwalk, Conn.; Rosemary Andino, Brooklyn, N.Y.

[73] Assignee: Novo Industri A/S, Bagsvaerd, Denmark

[22] Filed: Dec. 19, 1975

[21] Appl. No.: 642,474

[52] U.S. Cl. .................................. 195/31 R; 127/29

[51] Int. Cl.[2] .......................................... C12D 13/02

[58] Field of Search ............. 195/31 R, 11, 7, 66 R, 195/65; 127/29

[56] References Cited

UNITED STATES PATENTS

| | | | |
|---|---|---|---|
| 3,249,514 | 5/1966 | Bode | 195/66 R |
| 3,912,590 | 10/1975 | Slott et al. | 195/31 R |
| 3,922,198 | 11/1975 | Kuske et al. | 195/31 R |

OTHER PUBLICATIONS

Madsen et al., "A New Heat Stable Bacterial Amylase and its Use in High Temperature Liquification", Die Starke vol. 25, No. 9 (1973) pp. 306–308.

Sroczynski et al., "Hydrolysis of Polysaccharides and Oligosaccharide during Saccharification of Starch by the Enzyme -Enzyme Method", i Chemical Abstracts, vol. 82, No. 20, p. 97, Abs. No. 126875 (1975).

Whistler et al., *Starch: Chemistry and Technology*, vol. 2, Academic Press, London and New York, (1967), pp. 131,553–131,565.

Underkofler et al., "Enzymes in the Starch Industry", *Die Starke*, vol. 17, No. 6 (1965), pp. 179–183.

*Primary Examiner*—A. Louis Monacell
*Assistant Examiner*—Thomas G. Wiseman
*Attorney, Agent, or Firm*—Fidelman, Wolffe & Waldron

[57] ABSTRACT

Saccharification of 10–20% solid content dextrin solutions for 15–75 hours at amyloglucosidase enzyme dosage levels of 0.3–1.0 AG u/g of solids results in glucose syrups with purity levels exceeding 98%.

Glucose purity levels in excess of 98.5% can be achieved if the dextrin solution is formed by enzymatic liquefaction of starch, and saccharification is carried out for 15–25 hours with 0.4–0.8 AG u/g.

4 Claims, No Drawings

PRODUCTION OF HIGH PURITY GLUCOSE SYRUPS

BACKGROUND OF THE INVENTION

This invention relates to the production of high purity glucose syrups directly from starch.

Crystalline dextrose or glucose is an essentially pure product, e.g. 99.5+% purity, and is of wide spread food and industrial usage. Manifestly some uses for dextrose, including for example preparation of intravenous feeding glucose solutions, require a dextrose of utmost purity. For many uses, including for example employment as the starting material for manufacture of sorbitol, and as the dextrose supplement in fermentation media, minor impurity levels can be tolerated and dextrose of purity levels exceeding 98% would be quite adequate. Nonetheless, crystalline dextrose is employed for such uses, likely because heretofor the art has not provided any satisfactory alternative to crystalline dextrose. The art has been able to offer in large quantities, either crystalline dextrose or a (glucose) syrup containing something less than about 95% purity dextrose on a dry weight basis, and 95% purity is considered inadequate for many dextrose uses.

The less than 95% purity level of the glucose syrups available until the recent development of enzymatic starch liquefaction procedures encouraged many potential syrup users to employ crystalline dextrose creating a strong tendency for continued use of crystalline dextrose in face of the availability of 98 DE syrups (which represents a purity level of about 97%). Little or no substitution of glucose syrup for crystalline dextrose can be forseen until 98% or purer glucose syrup can be made available.

Historically (corn) starch has been converted to high DE glucose syrups by heating an acidified starch slurry which liquefies the starch and thereafter enzymatically saccharifying the liquefied starch (or dextrin) solution to a high DE level. Side reactions during liquefaction and during saacharification create polysaacharide impurities. Purification of the syrup by carbon treatment and by ion exchange treatment will remove noncarbohydrate impurities, but polysaacharide impurities remain in the syrup. The best glucose (or dextrose) purity levels achieved in industrial practice is believed to be about 95 DE. Substitution of a combination acid/(alpha-amylase) enzyme starch liquefaction procedure for the acid liquefaction can result in glucose syrup purity levels of about 97 DE. Careful enzymatic liquefaction results in a further purity improvement, but only to about 98 DE. Manifestly, further purity improvement of any real significance can come only by coupling the best known starch liquefaction procedure to a superior saacharification procedure.

THE INVENTION

The object of this invention is to make available to the art glucose syrups with a purity level exceeding about 98.0% glucose, and preferably exceeding 98.5% in purity.

Briefly stated, the invention is directed to a procedure for saacharifying enzymatically liquefied starch solutions under conditions productive of glucose syrups with at least about 98.0% glucose on a dry weight basis.

RATIONALE OF THE INVENTION

Basically, the rationale of the present invention is that crystalline dextrose must always command a substantial price premium over glucose syrups to cover the cost of crystallizing the dextrose and the loss of yield attributable to the crystallization. Therefore, direct substitution of a high purity glucose syrup for crystalline dextrose offers significant cost advantages to the user. Sometimes syrups offer process advantages as well, notably for instances where the crystalline dextrose must be converted into a syrup. In any event, high purity glucose can be made by procedures more costly than those associated with lower purity syrups, yet be an economic worthwhile product.

DETAILED PRACTICE OF THE INVENTION

Preparation of high purity glucose syrups commences with starch and for practice of the present invention, careful enzymatic liquefaction of a (corn) starch slurry is contemplated as preliminary to saccharification. Preferably, the starch content is 30–50% by wt. dsb. (dry starch basis). A preferred enzyme is the alpha-amylase from *B. licheniformis*.

Also preferred is liquefaction of the starch according to the procedures described by Slott et al., in U.S. Pat. No. 3,912,490, granted Oct. 14, 1975.

The mode of enzyme liquefaction believed to provide the highest yield and quality syrup involves passing a 30–50 wt. % (dsb) starch slurry pH adjusted to 6.5–7.0 with 0.1–0.01% enzyme (of activity equal to Termamyl liquid 120) into a jet cooker by direct steam injection, heating the starch slurry to 105°–110° C, then holding for 5–10 minutes at that temperature, followed by cooling of the slurry to 95° C. The now liquefied starch is held at 95° C for 1–2 hours to complete liquefaction. The liquefied starch, which constitutes a stable dextrin solution of a DE below about 30, is thereafter cooled, pH adjusted and then saccharified.

Saccharification according to the present invention is carried out as a batch reaction at 55°–60° C, pH 4.0–5.0 with amyloglucosidase. The process conditions are 15–75 hours, 15–25 hours preferred, a dextrin solution of solids content 10–20%, and an enzyme dosage of 0.3–1.0 AG u/g, based on the weight of starch; 0.4–0.8 AG u/g is a preferred range. These saccharifying conditions result in better than 98% purity. Purity levels of 99% can be achieved. At the end of the selected conversion period saccharification is halted (e.g. by heating the solution to 80° C).

One AG unit is the amount of enzyme which splits one micromole of maltose per minute at 25° C and pH 4.3. A commercially available liquid form of amyloglucosidase (Amyloglucosidase Novo 150) has an activity of 150 AG units per ml.

The actual saccharifying conditions herein described are believed to be quite different from those heretofor suggested to the art. A typical saccharification time suggested to the art is 72 hours; for preferred practice of this invention less than one-third of this saccharification time period is employed. Enzyme dosage is far more than that normally suggested to the art. The solids content of the dextrin solution is considerably below that preferred by the art. As a whole, the saccharification conditions employed according to the present invention are believed to be at odds with usual practices heretofore employed for saccharification.

Test studies made on enzymatic saccharification indicate that the polysaccharide impurities present in the glucose syrup are due to resynthesis of maltose and isomaltose from glucose and that the resynthesis reaction or reactions are catalyzed by the amyloglucosidase enzyme. The resynthesis side reaction is believed to be attributable to the amyloglucosidase itself, not to presence of enzymatically active impurities in commercial enzyme products.

Since the same enzyme converts dextrin to glucose and glucose to polysaccharide impurities, the process conditions described above for producing high purity glucose syrups are, of course, those conditions most favorable to saccharification and least favorable to resynthesis. Inherently, the numerical limits provided above for enzyme and substrate concentrations and for conversion times are arbitrary, since deviations therefrom will cause but incremental changes in purity levels. As it is good prior art practice can achieve about 97% purity levels. However, to produce glucose syrup of a purity exceeding about 98.5% consistently operations confortably inside the above indicated preferred numerical limits are believed to be necessary.

All the purity changes attributable to variations in the operating parameters are not completely understood. For example, although highest purity levels for the product glucose syrup (99% dextrose) were achieved by a short term treatment of less than about 25 hours as is herein preferred, extended saccharification times of 72 hours resulted in only nominally lower purity levels (98.6% dextrose). Indeed, test results indicate that at the lower end of the above specified enzyme dosage levels, namely 0.3–0.5 AG u/g, saccharification times exceeding 25 hours might result in a nominal purity improvement, e.g. from 98.3 to 98.6% glucose.

Other of the operating parameters are believed to be better understood. The purity levels obtained in the glucose syrup seem relatively insensitive to pH variation within the pH 4.0–5.0 range and to treatment temperature variation within the 55°–60° C range.

The consequences attributable to substrate concentration have been well explored, and in fact have been appreciated (but largely ignored) by the art. The DE, i.e, purity, of the saccharification product syrup is known to decrease with increasing concentration. This dependence of DE level on substrate concentration has been recognized by the art, but as a practical matter, the expense and nuisance of handling and evaporating large quantities of water to produce concentrated glucose syrups, or a crystalline dextrose product, have been reasons enough for the art to exhibit a strong preference to saccharify concentrated syrups of 30–50% solids content and indeed most workers in the art would prefer to saccharify 40–50% syrups.

As a practical matter, the low 10–20% w/w substrate concentration contemplated for saccharification according to this invention is not an insuperable burden. More rapid saccharification can be performed, which reduces tankage requirements almost in proportion to the volume increase dictated by lowered solids content. The slightly higher product yields per ton of starch, and economic desirability of high purity syrups are economic advantages which counter the economic disability of a dilute glucose solution. On the whole, the 99% purity glucose solution produced according to practice of this invention is a more economic source of glucose than crystalline dextrose.

The dosage levels of 0.30–1.0 AG u/g (starch dsb) employed for practice of this invention is distinctly higher than is suggested by the art for saccharification. 0.20 AG u/g is more than enough to saccharify completely. Indeed, prevalent in the art is a belief that employment of greater quantities than about 0.20 AG will usually result in lowered syrup purity. This has not been found to be completely true. The data elicited in the 10–20% w/w syrup range indicates that at dosages between about 0.15–0.40 AG u/g, syrup purity increases nominally (98% to 98.5%) with increased conversion time beyond 25 hours. However, in the preferred dosage range of 0.40–0.80 AG u/g, purity decreases when conversion time is increased beyond 25 hours. The best purity level achieved (99+% dextrose) has been at 18 hours and at 0.625 and 0.75 AG u/g. Still higher enzyme dosages, e.g. about 0.80, and particularly above 1.0 AG u/g, result in lower purity levels, even with short conversion times, i.e. below about 15 hours. All in all, the preferred reaction conditions of 0.40–0.80 AG u/g, 10–20% w/w solids content in the syrup and 15–25 hours will result in glucose syrups with over 98.5% dextrose on a dry solids basis. Operations outside of the preferred ranges, but within the broader ranges of 0.30–1.0 AG u/g at 15–75 hours to complete saccharification (then stop) can achieve syrups with over 98.0% dextrose on a dry solids basis. In any installation, the best reaction time for plant operations may have to be determined experimentally, since purity levels decline somewhat from peak yield and purity if the conversion is not then terminated. Desirably, the saccharification is monitored and then halted (e.g. heat to 80° C) when the best conversion level is obtained.

Purity levels exceeding about 98% dextrose are important to acceptance of glucose syrups in substitution for crystalline dextrose, because a widely distributed specification (of the Codex Committee on Sugar, 1967) for crystalline dextrose calls for 98% purity. Accordingly, the 97% purity available according to prior art practices fails to meet this specification, but the 98% and higher purity achieved by practice of this invention satisifies the specification.

One further advantage of the present invention is that it can be practiced on relatively small scale, permitting dextrose users to integrate backwards, and commence with starch. In addition, glucose syrup producers can employ already existing equipment to make high purity syrup whenever demand exists for higher than usual purity syrup, by shifting their saccharification procedure to practice of this invention.

For further understanding of this invention the following specific examples thereof are presented:

EXAMPLES 1–9

A 40% w/v dsb suspension of cornstarch in deionized water with the addition of 20 ppm Ca was treated with 0.15% wt % dsb of B. licheniformis derived alpha amylase (TERMAMYL Liquid 60), jet cooked and held at 105° C for 5 minutes. The starch solution was flash cooled to 95° C and kept at 95° C for 1 hour. After 1 hour holding period the pH was adjusted to 4.5. The solution was filtered, then the temperature was dropped to 60° C. The resultant thinned starch (DE 10-12) was then divided into 1 liter Aliquots adjusted to 10–12% solids. These samples were then saccharified with varying levels of Amyloglucosidase (Novo) from 0.15 AG u/g dsb to 0.75 AG u/g dsb. (The definition of the unit: One AG unit is the amount of enzyme which splits one micromoles of maltose per minute at 25° C and pH 4.3.) With the enzymes added, the starch slurry was converted at 55° C, 60° C and at pH 4.0, 4.5 and 5.0 for a period of 17–72 hours. At the end of the reaction period (18–72 hours) the amyloglucosidase action was stopped by heating to 85–90° C for 10 minutes. Dextrose content was determined by liquid chromatography. These details of each test and the test results are as follows:

TABLE 1

| No. | % w/w | AMG 150 u/g dsb | pH | Temp. | % Dextrose | Time for Saccharification |
|---|---|---|---|---|---|---|
| 1 | 11 | .15 | 4.5 | 60 | 98.0 | 48 hours |
| 2 | 10 | .30 | 4.5 | 55 | 98.3 | 24 hours |
| 3 | 10 | .30 | 4.5 | 60 | 98.6 | 72 hours |
| 4 | 11 | .47 | 4.5 | 55 | 98.0 | 72 hours |
| 5 | 10 | .60 | 4.5 | 55 | 98.8 | 18 hours |
| 6 | 12 | .75 | 4.5 | 55 | 99.1 | 18 hours |
| 7 | 12 | .75 | 4.5 | 55 | 98.9 | 18 hours |
| 8 | 12 | .46 | 4.0 | 55 | 98.6 | 72 hours |
| 9 | 10.5 | .75 | 4.0 | 55 | 98.5 | 18 hours |

EXAMPLE 10

A 25 gallon batch of 12% w/w solids content dextrin solution was prepared from cornstarch according to the procedure described in Examples 1–9.

This large sample was saccharified with 0.625 AG u/g dsb at pH 4.5, 55° C for 18 hours. The resulting glucose syrup was carbon treated, then vacuum evaporated to 70% solids and thereafter tested for purity. The solids content analyzed out as 99.2% dextrose.

What is claimed is:

1. A process for converting starch into a glucose syrup containing at least 98% glucose on a dry solids basis comprising:

a. enzymatically liquefying a starch slurry to produce thereby a dextrin solution;
b. saccharifying the resulting dextrin solution at a 10–20% w/w dsb solids content enzymatically for from about 15–75 hours with amyloglucosidase at an enzyme dosage of 0.30–1.0 AG units per gram of starch solids;
c. halting the saccharification when the glucose content exceeds 98% on a dry solids basis.

2. The process of claim 1 wherein the enzyme dosage is in the range of 0.4–0.8 AG units/g and the saccharification time period is in the range of 15–25 hours.

3. A method for saccharifying a dextrin solution to glucose syrups exceeding 98% glucose on a dry solids basis which comprises:

a. saccharifying a 10–20% w/w dextrin solution enzymatically from about 15–75 hours with amyloglucosidase at an enzyme dosage of 0.3–1.0 AG units per gram of dextrin solids;
b. halting the saccharification when the glucose content exceeds 98% on a dry solids basis.

4. The process of claim 3 wherein the enzyme dosage is in the range of 0.4–0.8 AG units/g and the saccharification time period is in the range of 15–25 hours.

* * * * *